(12) United States Patent
Preslan et al.

(10) Patent No.: US 9,898,468 B2
(45) Date of Patent: Feb. 20, 2018

(54) SINGLE PASS FILE SYSTEM REPAIR WITH COPY ON WRITE

(71) Applicant: Quantum Corporation, San Jose, CA (US)

(72) Inventors: Ken Preslan, Minneapolis, MN (US); Stephen Lord, Prior Lake, MN (US)

(73) Assignee: Quantum Corporation, San Jose, CA (US)

( * ) Notice: Subject to any disclaimer, the term of this patent is extended or adjusted under 35 U.S.C. 154(b) by 212 days.

(21) Appl. No.: 14/132,324

(22) Filed: Dec. 18, 2013

(65) Prior Publication Data

US 2015/0169668 A1 Jun. 18, 2015

(51) Int. Cl.
*G06F 17/20* (2006.01)
*G06F 17/30* (2006.01)

(52) U.S. Cl.
CPC ................ *G06F 17/3007* (2013.01)

(58) Field of Classification Search
CPC .... G06F 12/0246; G06F 3/064; G06F 3/0638; G06F 11/08
See application file for complete search history.

(56) References Cited

U.S. PATENT DOCUMENTS

| | | | | | |
|---|---|---|---|---|---|
| 5,794,242 | A * | 8/1998 | Green | ..................... | G06F 17/30 707/999.003 |
| 5,867,640 | A * | 2/1999 | Aguilar | ............... | G06F 11/1076 714/6.12 |
| 7,472,253 | B1 * | 12/2008 | Cameron | ............ | G06F 12/1045 711/203 |
| 7,526,622 | B1 * | 4/2009 | Bonwick | ................ | G06F 3/061 711/161 |
| 7,526,777 | B2 * | 4/2009 | Gazda | ................ | G06F 9/45537 717/147 |
| 8,417,987 | B1 * | 4/2013 | Goel | ................... | G06F 11/1076 714/6.1 |
| 8,924,773 | B1 * | 12/2014 | Veeraswamy | ....... | G06F 11/0793 714/6.1 |
| 2003/0204534 | A1 * | 10/2003 | Hopeman | ......... | G06F 17/30595 707/999.2 |
| 2004/0260673 | A1 * | 12/2004 | Hitz | .................... | G06F 11/1435 707/999.001 |
| 2012/0173822 | A1 * | 7/2012 | Testardi | .............. | G06F 11/1453 711/135 |
| 2012/0210095 | A1 * | 8/2012 | Nellans | ............... | G06F 12/1072 711/206 |

OTHER PUBLICATIONS

Green et al. "Designing a Fast On-line Backup System for a Log-structured File system", Dligital Technical Journal vol. 8 No. 2, 1996.*

* cited by examiner

*Primary Examiner* — Carol Choi
(74) *Attorney, Agent, or Firm* — Eschweiler & Potashnik, LLC

(57) ABSTRACT

Example apparatus and methods concern identifying an error in a file system. The error is identified during one or more b-tree traversals through the file system. A fix for the error is produced upon detecting the error. Data or metadata associated with the fix is not initially written to the file system, but instead is stored somewhere other than the file system using a copy on write approach. After the traversals are complete, the file system may be fixed using the data or metadata stored using the copy on write approach.

13 Claims, 7 Drawing Sheets

SINGLE PASS FILE SYSTEM REPAIR WITH COPY ON WRITE

BACKGROUND

File systems store files and store information about files. The information stored in files may be referred to as data. The information about files may be referred to as metadata. The collection of files and metadata may be referred to collectively as a file system. When the data in a file changes, the metadata about that file in the file system may also be changed. For example, if the contents of a file are changed, the metadata may be updated to reflect the time at which the change was made and by whom the change was made. The file system metadata may be stored in a set of data structures including inodes, btrees, directory structures, and others.

Over time, a file system may develop inconsistencies or other errors. Therefore, tools may be provided for checking the consistency or state of a file system. For example, the system utility fsck ("file system check") can be used to check the consistency of a file system. Conventional file system checkers may make two passes through the file system. For example, a first pass may be performed in a read-only mode to discover problems in the file system. Once the problems are identified, a second pass may be performed in a read-write mode to attempt to actually fix the problems discovered during the read-only pass. Conventionally, fixing the problems may include writing new blocks to the file system, deleting blocks from the file system, editing existing blocks or data structures, or other actions.

Conventionally, the two pass approach made sense because it was a good idea to identify problems in the file system and to identify what could be done about those problems before deciding to remedy or ignore the errors. Unfortunately, making two complete passes through the file system may have consumed an unacceptable amount of time. The amount of time may have been unacceptable because the file system may have been made unavailable to users while the two passes were performed. Additionally, the act of making a first pass through the file system in read-only mode may have produced artifacts or false errors when reporting problems. By way of illustration, during the first pass through the file system, a conventional file system checker may identify three problems. The three problems may be recorded and presented to the second pass for repair. However, during the second pass, fixing the first problem may also fix the third problem. Therefore, the third problem may become an artifact that the second pass attempts to fix even though the problem no longer exists after the first problem is fixed.

The two pass approach may produce artifacts or other errors due to the sequence with which discovered problems may be fixed. Conventionally, malformed modes may be fixed first, then btrees associated with the malformed modes may be fixed, and then directory information associated with the btrees may be repaired. In the read-only pass, the errors may be discovered but not repaired, because the first pass is read-only and making repairs may require writing to the file system. Then, during the second pass, errors that were detected during the first pass and scheduled for fixing during the second pass may no longer exist when the second pass gets to the scheduled fix. Therefore, later btree and directory checks might report false problems.

Even worse, the act of making a scheduled fix of an error detected during the first pass may produce a new error that is not scheduled for repair. Thus, the second pass may complete all the fixes identified in the first pass but may not fix a new error or inconsistency produced by fixing a problem identified in the first pass. Making a change to a file may require the file system to perform several operations. Ideally, the operations would either be "all done" or "none done." Undesirable conditions may arise if a series of operations are only partially done. Thus, a file system may choose to treat a series of operations as a transaction. Example transactions may include allocating space for a file, creating a file, updating a file, deleting a file, or other operations. While the file system may choose to treat operations as a transaction, an underlying operating system or other actor (e.g., storage system) may only be able to guarantee that individual members of the series of operations are performed as atomic operations. When a transaction does not complete, inconsistencies may be produced. A transaction may not complete as a result of different error conditions.

Therefore, file systems may use a journal to help support correctly performing a series of operations as a single file system transaction. The journal may be, for example, a disk-based structure that can store information about operations to be performed to transition a file system from a first state to a second state. The journal may be used to store a complete representation of the set of operations that are to be completed for the file system transaction. For example, the journal may store a linear sequence of underlying operations that are to be performed as part of the file system transaction. Conventionally it was thought that once the set of operations to be performed were written in the journal, the set of operations could be started safely in the knowledge that if something went wrong, it may have been possible to back out of the set of operations using the information stored in the journal.

One issue with file systems arises due to the difference in latency between memory and non-memory (e.g., disk, tape) storage. This latency can produce conditions where changes made in one area (e.g., memory) are out of sync with changes made in another area (e.g., disk). Additionally, this latency motivates a file system to store in memory changes that are to be made to data on disk and then to make the actual changes on disk at a later time. For example, a series of reads and writes to a file may be made virtually in memory and then only made physically on disk at a later time. While this delayed update approach may solve one problem associated with excessive random input/output (i/o), it may produce another problem associated with memory and disk being out of synchronization. When the memory and disk get out of synchronization, then the file system may become inconsistent. The file system metadata may indicate that a change has been made, and that change may have been performed in memory, but the actual underlying data on disk may not have been changed.

Running a conventional file system checker on a file system that is mounted for read/write operations may produce data corruption or loss. Therefore, a file system is typically checked while the file system is un-mounted, while the file system is mounted read-only, or while the file system is in a special maintenance mode that limits the risk of damage. Thus, running a conventional file system checker may have required the file system to be taken out of operation. When 24/7/365 operations are expected or required, it may be difficult, if even possible at all, to run a conventional file system checker, which may lead to small inconsistencies or errors in the file system developing into potentially catastrophic errors.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
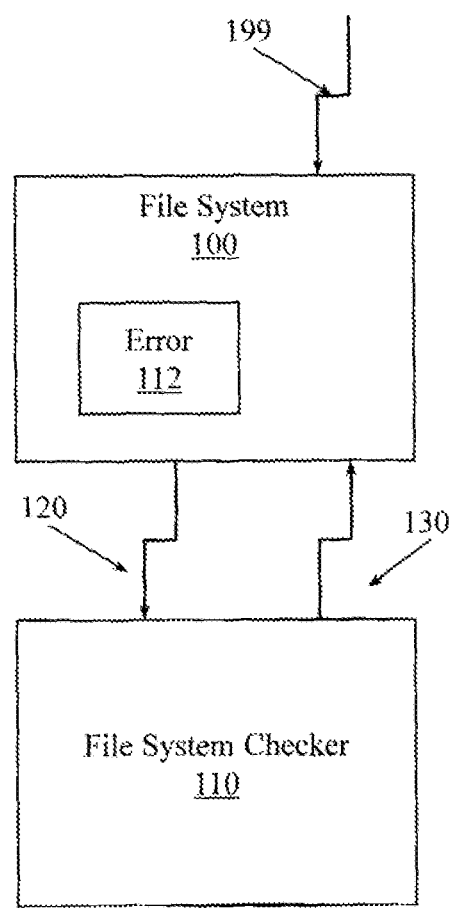
FIG. 1 illustrates a conventional file system and file system checker.

Example apparatus and methods support single pass file system repair using a file system checker that uses a copy on write approach. In one embodiment, repairs are performed as errors are detected during the single pass through the file system. Rather than performing repairs in the active file system, a repair may be performed by writing a change to, for example, a copy on write buffer. Writing the change to the copy on write buffer may include writing a block of memory to the buffer, writing a value to a data structure in the buffer, updating a value or block in the buffer, or other tangible action that changes the physical contents of the buffer. While a copy on write buffer is described, more generally, a copy on write approach is employed. The copy on write approach may include writing to a buffer in memory, writing to a buffer on disk, writing to a solid state device (SSD), writing to a tape, sending a message to a copy on write process, interacting with a copy on write service, or other actions that cause data associated with the repair to be stored somewhere other than the actual file system. The data may be a file system block storing file data or may be metadata.

The copy on write buffer may store a sparse copy of the file system on separate storage. Writes to the file system may be posted to the copy on write buffer, process, service, or data store rather than to the actual file system. Thus, performing the repair does not change the file system itself immediately, but rather causes a change in the copy on write buffer, process, service, or data store. Once a problem has been repaired, a user may be queried to determine whether they would like to commit the repair. If the answer is "no" that the user does not want to commit the repair, then the contents of the copy on write buffer associated with the repair may be discarded. If the answer is "yes", that the user does want to commit the repair, then the block or data or other material in the copy on write buffer may be used to update the actual file system. In one embodiment, the user may be queried on a per-repair basis. In another embodiment, the user may be queried after all repairs have been made. In yet another embodiment, a user may be queried after certain types of repairs have been made or after a certain number of repairs have been made.

Since writes to the file system are sent to the copy on write buffer instead of to the actual file system, the changed file system blocks are found in the copy on write buffer and the copy on write buffer may only have changed blocks. As the file system checker proceeds in its single pass, or as the active file system continues operations, reads to the file system may be redirected to first check to see whether a block to be read is represented in the copy on write buffer. If the block is present in the copy on write buffer, then the block may be read from the copy on write buffer. In this way, a first fix at an earlier time will be reflected in the copy on write buffer for a second fix at a second later time. If the block is not present in the copy on write buffer, then the block may be read from the actual file system.

Example apparatus and methods provide two improvements over conventional systems. The first improvement concerns the file system check and repair being performed in a single pass. The second improvement concerns performing repairs as problems are encountered in the single pass. The repairs are made by writing updated blocks, data, or other information to the copy on write buffer. Since the repairs are made as the problems are encountered, no strange artifacts are introduced to the description of the problems and the related fixes.

Figure one illustrates a file system 100 and a conventional file system checker 110. The conventional file system checker 110 checks the file system 100. Checking the file system 100 may involve performing a read 120. The checker 110 may find an error 112. If the checker 110 finds error 112, then the checker 110 may perform a write 130 to the file system. The write 130 may be, for example, a repaired file system block that fixes the error 112. Since the checker 110 is reading from and writing to the file system 100, a read 199 from an application other than the checker 110 may need to be delayed until the checker 110 has completed its work. In one embodiment, other applications may not be granted access to the file system while the checking is in progress. Thus, in one embodiment, read 199 may be generated by the checker 110.

Figure 2:
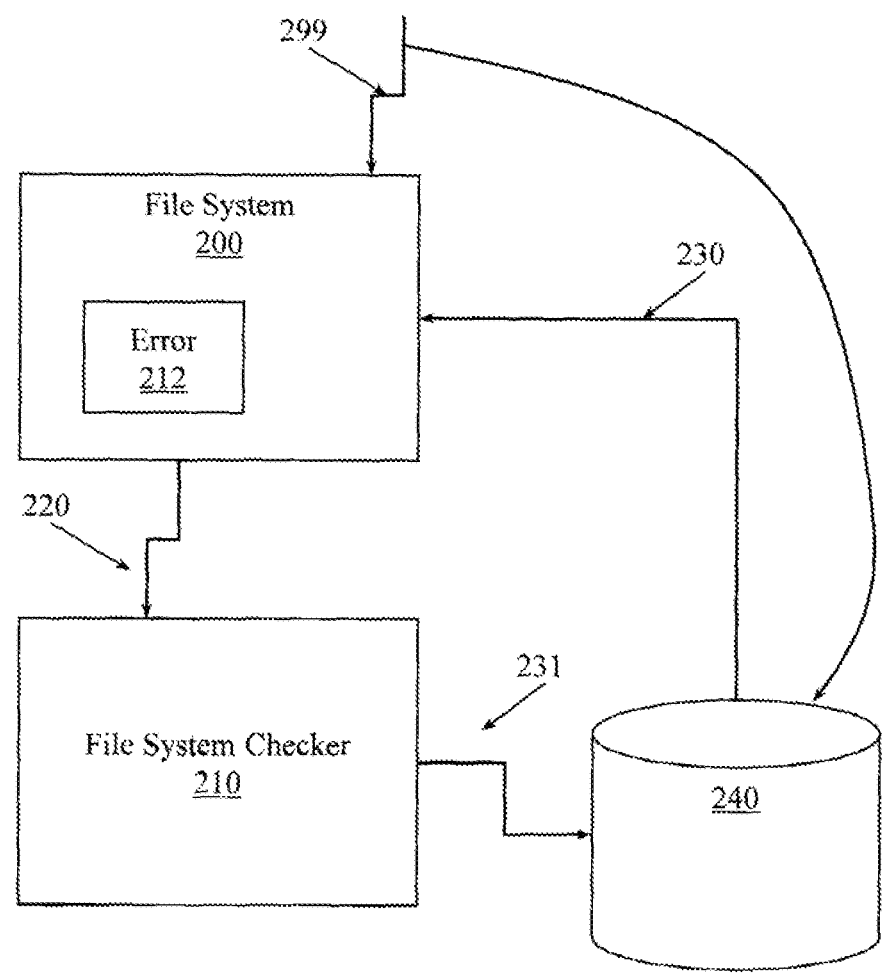
FIG. 2 illustrates a file system, a file system checker, and a write on copy data store.

FIG. 2 illustrates a file system 200, a single pass write on copy file system checker 210, and a write on copy buffer 240. The checker 210 may check the file system 200 to look for errors. Checking the file system 200 may involve performing a read 220. The checking may reveal an error 212. If an error 212 is detected, checker 210 may perform a write 231 to the copy on write buffer 240 instead of directly to the file system 200. The write 231 may include a repair block or other data for fixing the error 212. Since the checker 210 is reading the file system 200 and writing fixes to the copy on write buffer 240, a read 299 may be redirected to first look in the copy on write buffer 240 to see whether a block to be read has been updated. If the block has been updated and is in the copy on write buffer 240, then the data may be read from the buffer 240 instead of from the file system 200. If the block has not been updated and is not in the copy on write buffer 240, then the data may be read from the file system 200. Once the single pass checker 210 has completed, the file system 200 may be repaired using data stored in the buffer 240. In one embodiment, other applications may not be granted access to the file system while the checking is in progress. Thus, in one embodiment, read 299 may be generated by the checker 210.

When discussing computing and data storage, a block is generally considered to be a sequence of bits or bytes having a fixed length. The fixed length may be referred to as a block size. Data that is structured in this way is referred to as blocked data. Putting data into a block is referred to as blocking. Blocked data may be read a block at a time. Blocking is employed in storage devices including, but not limited to, tape drives, disks, NAND flash memory, and other devices. File systems may be based on a block device that provides an abstraction for the hardware used to store and retrieve specific blocks of data. In a file system, a block may contain only a part of a file. Looked at another way, a file may be stored in multiple blocks. Block storage may be abstracted using a file system. The physical or logical volumes accessed via block input/output may be associated with internal devices, external devices, devices accessed through a storage area network (SAN), or other devices.

A file system facilitates storing and retrieving information that is organized into files. The information may be separated into individual pieces that are named and stored separately. Named pieces of information may be called a file. The structure, logic rules, data structures, and apparatus used to manage the files may be referred to as a file system. Different file systems may have different structures, rules, and logic. File systems may rely on different types of storage devices. For example, a file system may store blocks or metadata on disks, tapes, in memory, on a redundant array of inexpensive disks (RAID), on a storage area network (SAN), on a solid state device (SSD), or on other devices. A file system may store blocks or metadata on combinations of devices.

More generally, a file system facilitates storing, retrieving, and managing (e.g., editing) a set of files. A file system may rely on physical devices, logical data structures, and processes or apparatus that store the information in the files and that store the metadata about the files.

An mode stores information about a file system object (e.g., file, device, pipe). An mode does not store the file's data. The file's data may be stored in a collection of blocks. A file system may rely on data about files, for example a list of blocks in which a file is stored. The metadata for a single file may be stored, at least in part, in an inode. The metadata for a collection of files may be stored in an mode table or other data structure. An inode may store information about file ownership, file access mode (e.g., read, write, execute), file type, and other information. A file system may store information about files in modes or in other data structures.

A btree is a tree data structure that keeps data sorted and that allows actions including searches, sequential access, insertions, or deletions in, for example, logarithmic time. A btree (or b-tree) may be a generalization of a binary search tree in that a btree may have more than the two children to which a binary tree is limited. A b-tree may be optimized for systems that read and write blocks of data, and thus a file system may store information about the blocks used to store file contents in a b-tree. A file system may also store information about the blocks used to store file contents in other data structures.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 3:
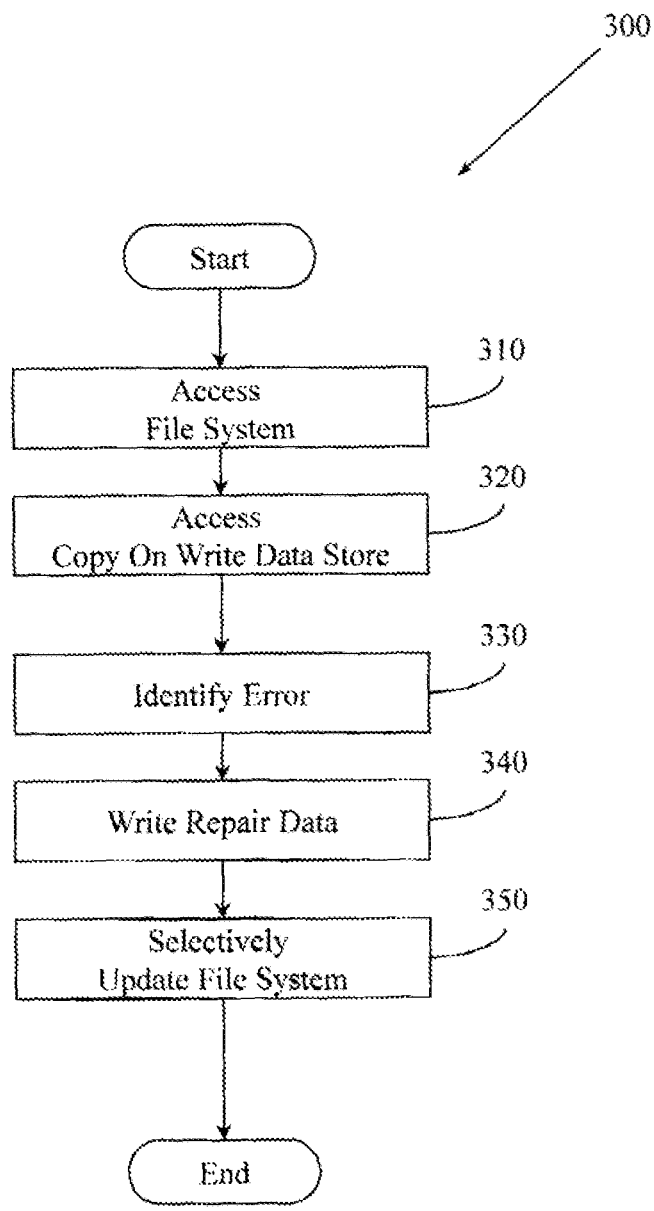
FIG. 3 illustrates an example method associated with single pass file system repair with copy on write.

FIG. 3 illustrates a method 300 associated with performing file system repair in a single pass using a copy on write approach. Method 300 includes, at 310, accessing a file system comprising a set of files and metadata concerning members of the set of files. In one embodiment the metadata may include a set of inodes or may be stored in a set of inodes. In one embodiment, accessing the file system includes accessing one or more disks on which the set of files are stored or on which the metadata is stored. In one embodiment, accessing the file system includes accessing a redundant array of independent disks (RAID) on which the set of files are stored or on which the metadata is stored. Accessing a disk or RAID or other device on which files or metadata is stored may include reading from an address, writing to an address, reading from a process, writing to a process, communicating with a service, establishing a socket through which communications may pass, establishing a pipe through which communications may pass, or other action.

Method 300 also includes, at 320, accessing a copy on write data store. In one embodiment, the copy on write data store is located on a disk, on a tape, on a solid state device, or on a storage area network. In another embodiment, the copy on write data store is located in the cloud or is managed by a service. Accessing a disk or RAID or other device or service involved in providing the copy on write data store may include reading from an address, writing to an address, reading from a process, writing to a process, communicating with a service, establishing a socket through which communications may pass, establishing a pipe through which communications may pass, or other action.

Method 300 also includes, at 330, identifying an error to be repaired in the file system. The error may be, for example, an incorrect checksum error, a broken btree link, an incorrect allocation value or other error. In one embodiment, the error is identified in a traversal of a data structure that organizes the file system. The data structure may be, for example, a tree, a b-tree, a table, a collection of data structures, or other data or metadata from which modes and files in a file system can be visited. The traversal may walk the data structure one or more times. In one embodiment, the traversal of the data structure may involve visiting any inode at most once or visiting any file at most once. In one embodiment, the traversal of a data structure that organizes the file system is performed while the checker is in a read-write mode.

Method 300 also includes, at 340, writing repair data to the copy on write data store. In one embodiment, the repair data may include information concerning a fix for the error. The information may be, for example, a replacement file system block, a replacement file system inode, data from which a file system block can be repaired, data from which an inode can be repaired, or other data.

Method 300 also includes, at 350, selectively updating the file system using the repair data stored in the copy on write data store. In one embodiment, selectively updating the file system using the repair data stored in the copy on write data store may include applying the repair data to fix the file system in response to receiving a signal from a user after the single pass has completed. In this embodiment, all the repair data in the copy on write data store may be applied to fix all the identified errors. In another embodiment, selectively updating the file system with the repair data stored in the copy on write data store may include applying a portion of the repair data to fix the file system in response to receiving a signal from a user before the single pass has completed. In this embodiment, less than all the repair data may be applied to fix selected errors as they are encountered. Other amounts of repair data may be applied in other embodiments.

Figure 4:
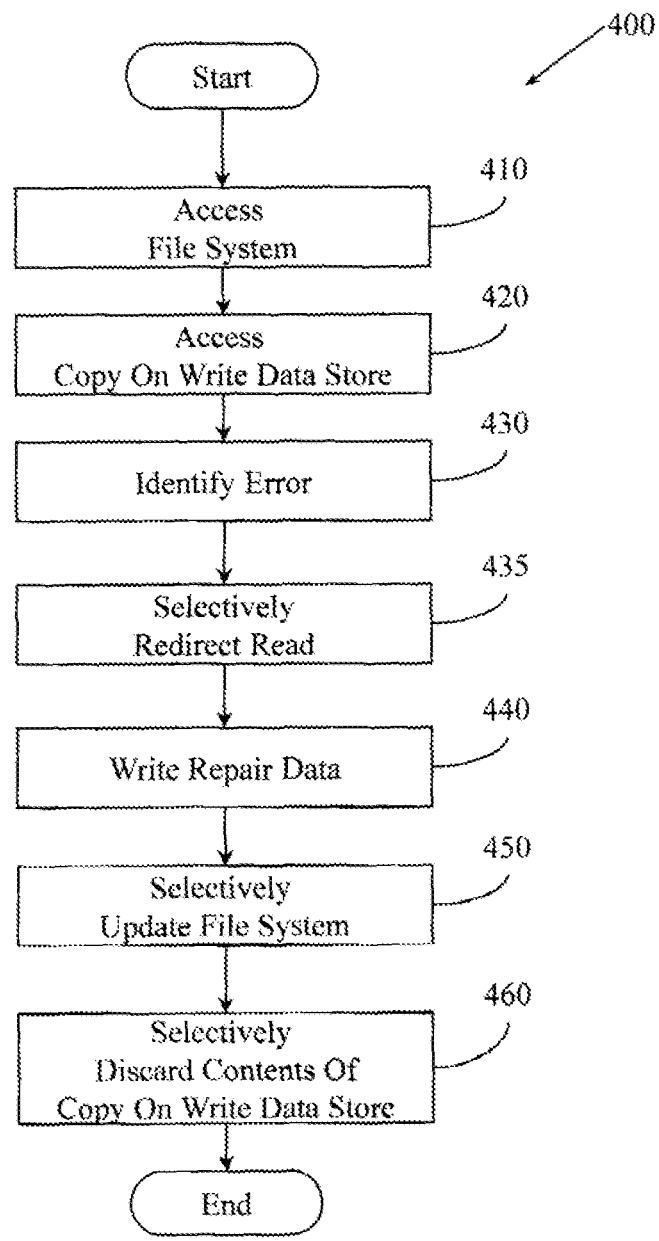
FIG. 4 illustrates an example method associated with single pass file system repair with copy on write.

FIG. 4 illustrates a method 400 associated with performing file system repair in a single pass using a copy on write approach. Method 400 includes some actions similar to method 300. For example, method 400 includes accessing a file system at 410, accessing a copy on write data store at 420, identifying an error at 430, writing repair data at 440 and selectively updating the file system at 450. However, method 400 includes additional actions. For example, method 400 includes, at 460, selectively discarding the contents of the copy on write data store. In one embodiment, the contents may be discarded after the file system has been repaired. In another embodiment, the contents may be discarded after a user that commissioned the file system check has indicated that a repair is not to be made.

Method 400 also includes, at 435, selectively redirecting a read intended for the file system. The read may be redirected to the copy on write data store to determine whether the read concerns a file system block for which repair data has been written to the copy on write data store. If repair data is present in the copy on write buffer, then the read may be satisfied, at least in part, from the repair data. If no repair data is present, then the read may proceed as normal to the file system.

In one example, a method may be implemented as computer executable instructions. Thus, in one example, a computer-readable medium may store computer executable instructions that if executed by a machine (e.g., processor) cause the machine to perform methods 300 or 400. While executable instructions associated with methods 300 and 400 are described as being stored on a computer-readable medium, it is to be appreciated that executable instructions associated with other example methods described herein may also be stored on a computer-readable medium.

Figure 5:
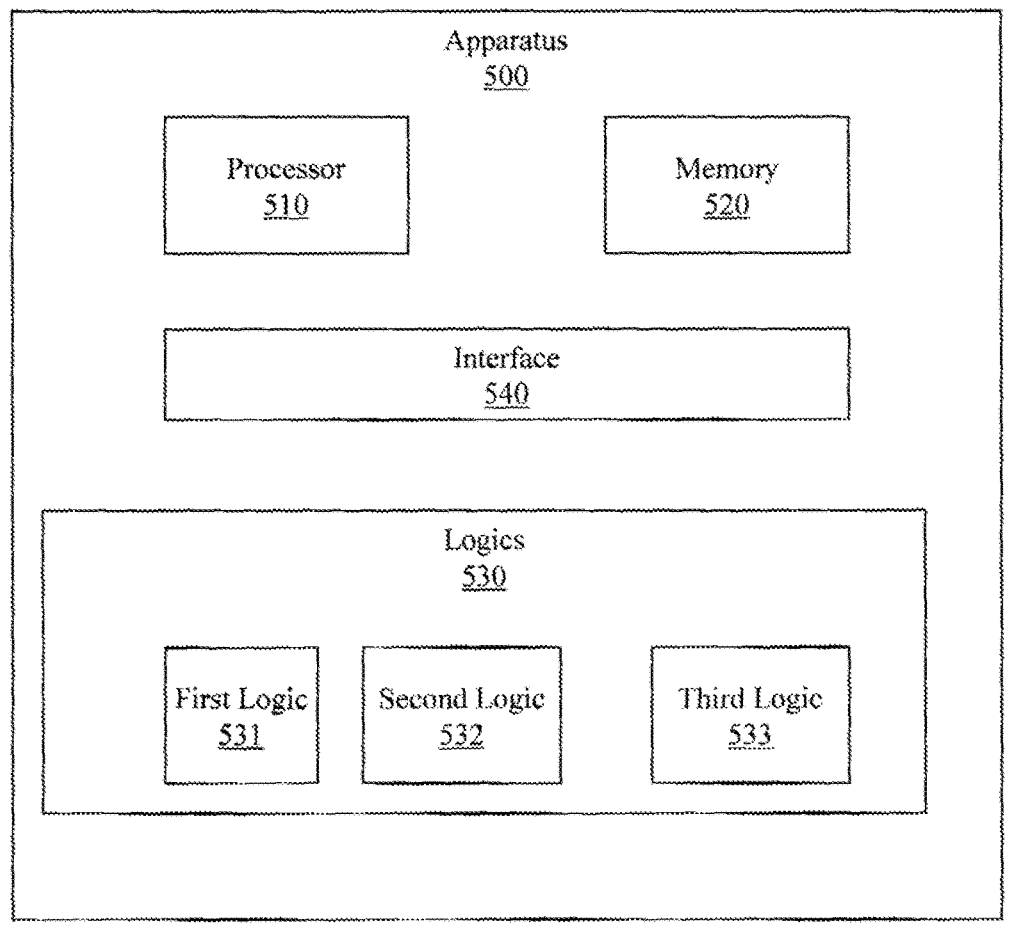
FIG. 5 illustrates an example apparatus associated with single pass file system repair with copy on write.

FIG. 5 illustrates an apparatus 500 configured to perform file system repair in a single pass using a copy on write approach. Apparatus 500 includes a processor 510, a memory 520, and a set 530 of logics that is connected to the processor 510 and memory 520 by an interface 540. The memory 520 may be configured to store a repaired file system block.

The set 530 of logics may include a first logic 531 that is configured to find a file system error. In one embodiment, when the file system is organized using a b-tree data structure, the first logic 531 may be configured to find the file system error or errors in a traversal(s) of the file system btree. In different embodiments, when the file system is organized using other data structures, the first logic 531 may be configured to find the file system error in a traversal of the organizing data structure or structures. The file system may be stored on a single disk, on a set of disks, on a redundant array of independent disks (RAID), or in other devices or combinations of devices.

The apparatus 500 may also include a second logic 532 that is configured to write the repaired file system block to the memory 520. The repaired file system block may be configured to repair the file system error. For example, a file system block that had an incorrect checksum may be repaired to include either a new correct checksum or may have its contents corrected so that the existing checksum is correct. In another example, a file system block that included a broken link in a data structure may have the link repaired or removed. In another example, a file system block that may have been allocated to more than one file may cause an additional block to be allocated and pointers to the second instance repaired. Other repairs may be performed.

In one embodiment, the second logic 532 may be configured to write the repaired file system block to the memory 520 while the traversal of the file system btree is in progress. While writing the repaired file system block to the memory 520 is described, in one embodiment, the repaired file system block may be written to a memory, disk, process, or service external to apparatus 500. In one embodiment, the second logic 532 may also be configured to redirect a read intended for the file system. For example, second logic 532 may attempt to satisfy a read from data in the copy on write data store before attempting to satisfy a read from the file system.

The apparatus 500 may also include a third logic 533 that is configured to selectively update the file system using the repaired file system block stored in the memory 520. In one embodiment, the second logic 532 may be configured to provide the repaired file system block to a copy on write process or service. In this embodiment, the third logic 533 may be configured to selectively update the file system using the repaired file system block provided to the copy on write process or service. Updating the file system may include, for example, replacing a block associated with an error with a repair block from memory 520. In one embodiment, the file system may be repaired while it is available in a read-write mode.

Figure 6:
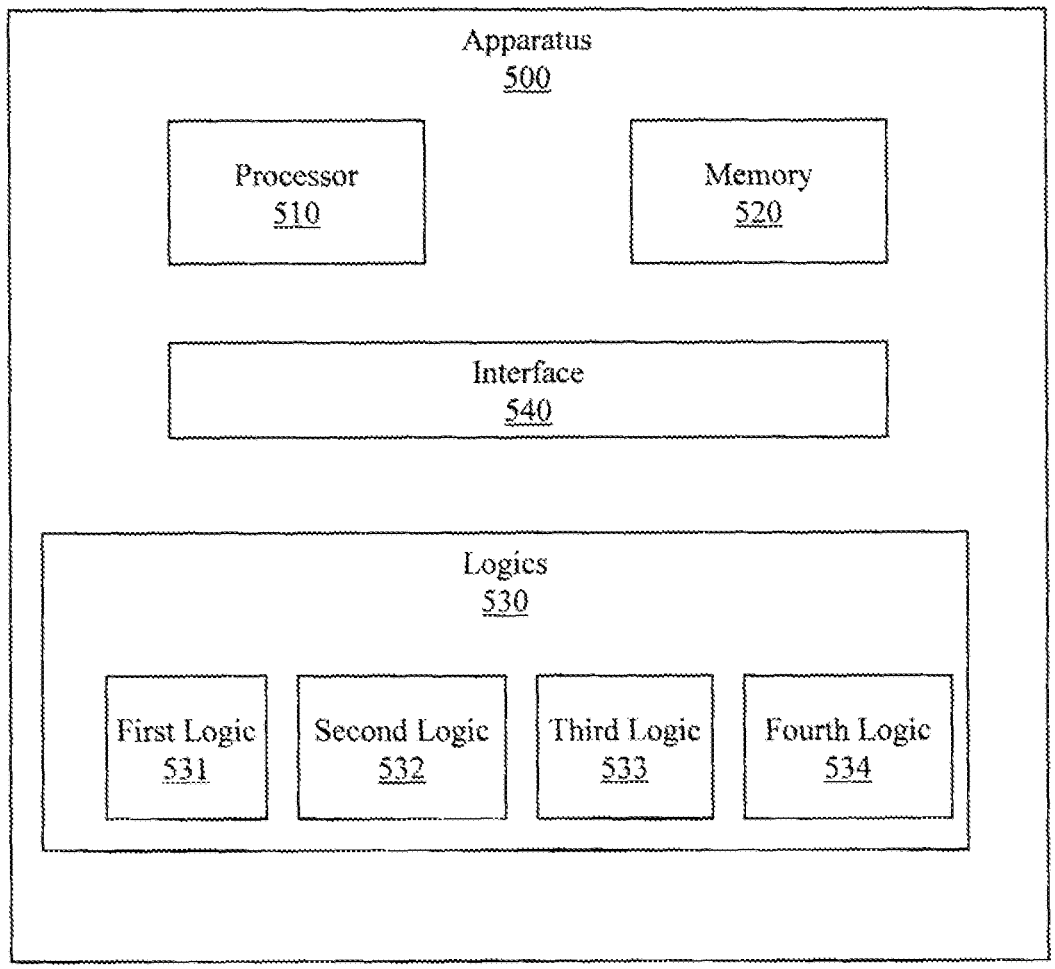
FIG. 6 illustrates an example apparatus associated with single pass file system repair with copy on write.

FIG. 6 illustrates another embodiment of apparatus 500. This embodiment includes a fourth logic 534. The fourth logic 534 may be configured to remove the repaired file system block from the memory 520. In one embodiment, the repaired file system block may be removed from the memory 520 after the repaired file system block has been used to fix the file system. In another embodiment, the repaired file system block may be removed from the memory 520 after a user indicates that the repair for which the repaired file system block would be applied is not to be performed. While a single error and a single repair block are described in connection with apparatus 500, the first logic 531, second logic 532, third logic 533, and fourth logic 534 may find multiple errors and process multiple repair blocks or other data.

Figure 7:
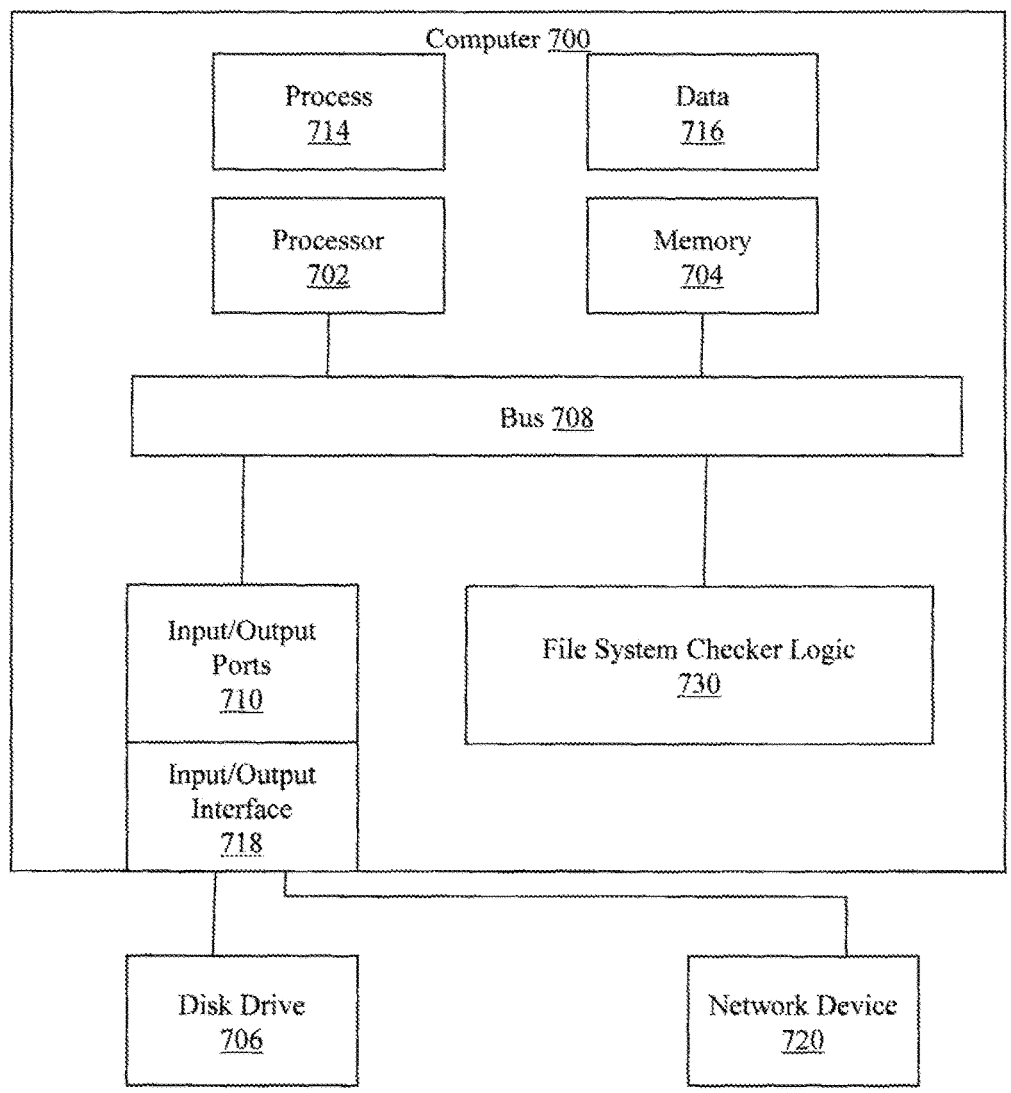
FIG. 7 illustrates an example apparatus associated with single pass file system repair with copy on write.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a file system checker logic 730 configured to perform file system repair in a single pass using a copy on write approach. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, software, firmware) for identifying an error in a file system operating in a read-write mode. The error may be identified during a single pass through the file system. The single pass may include performing a traversal(s) (e.g., depth first, breadth first) of a data structure (e.g., tree) that stores information about the file system. In one embodiment, the single pass may only visit any mode or any file one time.

Logic 730 may also provide means (e.g., hardware, software, firmware) for producing a fix for the error and for storing data or metadata associated with the fix using a copy on write approach that does not write directly to the file system. The copy on write approach may store a repair block or repair information in a memory, on a disk, at a server, in a service, in the cloud, or in another location other than the file system in which the error was detected.

Logic 730 may also provide means (e.g., hardware, software, firmware) for fixing the error in the file system using the data or metadata stored using the copy on write approach. Fixing the error may include updating a data store that stores information about the file system, replacing a block in the file system, removing a block in the file system, or other action.

The means associated with logic 730 may be implemented, for example, as an ASIC (application specific integrated circuit). The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, read-only memory (ROM), programmable ROM (PROM), and other memory. Volatile memory may include, for example, random access memory (RAM), synchronous RAM (SRAM), dynamic RAM (DRAM), and other memory.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, or other device. Furthermore, the disk 706 may be a compact disk ROM (CD-ROM) drive, a compact disk read (CD-R) drive, a compact disk read write (CD-RW) drive, a digital versatile drive (DVD) ROM drive, a Blu-Ray drive, an high-definition DVD (HD-DVD) drive, or other device. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and other devices. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a local area network LAN), a wide area network (WAN), and other networks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage device storing computer-executable instructions that when executed by a computer cause the computer to perform a method, the method comprising:
   accessing a file system comprising a set of files and metadata concerning members of the set of files, where the metadata includes a set of inodes;
   accessing a copy on write data store;
   in a single traversal of a data structure that organizes the file system, identifying an error to be repaired in the file system, where the single traversal of the data structure that organizes the file system is performed while the file system is in a read-write mode, where the single traversal of the data structure includes visiting a member of the set of inodes at most once or visiting a member of the set of files at most once;
   during the single traversal, writing a repair data to the copy on write data store, where the repair data comprises information concerning a fix for the error, where the information concerning a fix for the error includes a replacement file system block, a replacement file system inode, data from which a file system block can be repaired, or data from which an inode can be repaired;
   during the single traversal as the file system continues operations, attempting to satisfy a read intended for the file system using repair data associated with a target of the read by redirecting the read to the copy on write data store, where the repair data is stored in the copy on write data store;
   upon determining that the read intended for the file system cannot be satisfied using the copy on write data store: attempting to satisfy the read from the file system; and
   selectively updating the file system using the repair data stored in the copy on write data store, where selectively updating the file system with the repair data stored in the copy on write data store comprises providing the repair data to a copy on write process or service, and applying a portion of the repair data provided to the copy on write process or service to fix the file system in response to receiving a signal from a user before the single traversal has completed, where the portion of the repair data includes less than all the repair data.

2. The non-transitory computer-readable storage device of claim 1, where accessing the file system includes accessing one or more disks on which the set of files are stored.

3. The non-transitory computer-readable storage device of claim 1, where accessing the file system includes accessing one or more disks on which the set of files is stored and on which the metadata is stored.

4. The non-transitory computer-readable storage device of claim 1, where accessing the file system includes accessing a redundant array of independent disks (RAID) on which the metadata is stored.

5. The non-transitory computer-readable storage device of claim 1, where the copy on write data store is located on a disk, on a tape, on a solid state device, or on a storage area network.

6. The non-transitory computer-readable storage device of claim 1, where the copy on write data store is located in the cloud or is managed by a service.

7. The non-transitory computer-readable storage device of claim 1, where the repair data is a file system block.

8. The non-transitory computer-readable storage device of claim 1, where selectively updating the file system with the repair data stored in the copy on write data store comprises applying the repair data to fix the file system in response to receiving a signal from a user after the single traversal has completed.

9. The non-transitory computer-readable storage device of claim 1, the method comprising selectively discarding the contents of the copy on write data store.

10. An apparatus, comprising:
    a processor;
    a memory configured to store a repaired file system block;
    a set of logics; and
    an interface that connects the processor, the memory, and the set of logics;
    the set of logics comprising:
    a first logic that finds a file system error in a single traversal of a file system btree, where the single traversal includes visiting an inode in the file system btree at most once or visiting a file in the file system btree at most once;

a second logic that writes the repaired file system block to the memory while the single traversal of the file system btree is in progress, and that attempts to satisfy a read intended for the file system by redirecting the read from the file system to the memory before attempting to satisfy the read from the file system, where the repaired file system block repairs the file system error, and a third logic that selectively updates the file system using the repaired file system block stored in the memory in response to receiving a signal from a user before the single traversal has completed, where selectively updating the file system includes using less than all the repaired filed system block before the single traversal has completed, where the second logic provides the repaired file system block to a copy on write process or service, and where the third logic selectively updates the file system using the repaired file system block provided to the copy on write process or service.

11. The apparatus of claim 10, the file system being stored on a redundant array of independent disks (RAID).

12. The apparatus of claim 11, comprising a fourth logic that removes the repaired file system block from the memory.

13. A system, comprising:

means for identifying an error in an active file system by traversing, in a single traverse, a btree in the file system, where traversing the btree includes visiting an inode at most once or a file at most once;

means for producing a fix for the error and for storing data or metadata associated with the fix using a copy on write approach that does not write directly to the file system, and for attempting to satisfy a read intended for the file system from a memory traversal as the active file system continues operations by redirecting the read to the memory before attempting to satisfy the read from the file system, and means for fixing the error in the file system using less than all the data or less than all the metadata stored using the copy on write approach, where fixing the error includes, in response to receiving a signal from a user before the memory traversal has completed, providing the fix for the error or the data or metadata associated with the fix to a copy on write process or service, where using the copy on write approach includes reading the fix for the error or the data or metadata associated with the fix provided to the copy on write process or service from a process or writing to a process.

* * * * *